United States Patent [19]

Ueno et al.

[11] Patent Number: 5,099,132
[45] Date of Patent: Mar. 24, 1992

[54] DOSIMETER

[75] Inventors: Keiji Ueno; Akisato Katanosaka; Noriko Matoba, all of Osaka, Japan

[73] Assignee: Sumitomo Electric Industries, Ltd., Osaka, Japan

[21] Appl. No.: 760,841

[22] Filed: Sep. 17, 1991

Related U.S. Application Data

[63] Continuation of Ser. No. 670,409, Mar. 15, 1991, abandoned, which is a continuation of Ser. No. 128,241, Dec. 3, 1987, abandoned.

[30] Foreign Application Priority Data

Dec. 4, 1986 [JP] Japan .................. 61-290231
Feb. 2, 1987 [JP] Japan .................. 62-22914

[51] Int. Cl.⁵ .............................................. G01T 1/02
[52] U.S. Cl. ................... 250/474.1; 250/472.1; 250/473.1
[58] Field of Search ............. 250/474.1, 473.1, 472.1

[56] References Cited

U.S. PATENT DOCUMENTS

| | | | |
|---|---|---|---|
| 3,290,499 | 12/1966 | Vale et al. | 250/474.1 |
| 3,899,677 | 8/1975 | Hori et al. | 250/474.1 |
| 4,001,587 | 1/1977 | Panchenkov et al. | 250/474.1 |
| 4,113,703 | 9/1978 | Blumenfeld et al. | 528/299 |
| 4,433,132 | 2/1984 | Rogers et al. | 528/299 |
| 4,554,206 | 11/1985 | Hilbert et al. | 528/299 |
| 4,569,986 | 2/1986 | Oshima et al. | 528/299 |

FOREIGN PATENT DOCUMENTS

| | | | |
|---|---|---|---|
| 1194931 | 6/1970 | United Kingdom | 250/473.1 |
| 2139369 | 11/1984 | United Kingdom | 250/474.1 |

OTHER PUBLICATIONS

McLaughlin, *Manual on Radiation Dosimetry*, Holm and Berry—editors, published by Marcel Dekker, Inc. New York (1970) p. 140.

Humpherys et al. "Radiachromic: A Radiation Monitoring System", *Radiation Physical Chemistry* vol. 9 Nos. 4-6 pp. 737-747, Apr. 1977.

*Primary Examiner*—Constantine Hannaher
*Attorney, Agent, or Firm*—Sughrue, Mion, Zinn Macpeak & Seas

[57] ABSTRACT

A dosimeter comprising a support having provided thereon a radiation-sensitive layer which comprises (a) a polymer containing halogen atoms or a polymer containing acetic acid groups and (b) a pH-sensitive indicator dye. The dosimeter provides an easy determination of exposure dose by color change, even at high and low exposure doses.

13 Claims, 1 Drawing Sheet

DOSIMETER

This is a continuation of application Ser. No. 07/670,409, filed Mar. 15, 1991, now abandoned, which is a continuation of application Ser. No. 07/128,241, filed Dec. 3, 1987, now abandoned.

FIELD OF THE INVENTION

The present invention relates to a dosimeter, and more particularly, a dosimeter using a radiation-sensitive (color-changing) paint by which an exposure dose of ionizing radiation, such as electron rays and γ-rays, can be determined easily.

BACKGROUND OF THE INVENTION

Recently, radiation has been industrially utilized in extremely wide fields of industry, such as preservation of foods, sterilization of medical equipment, crosslinking of plastics (e.g., electric cables, shrinkable tubes, etc.). Since the exposure dose of radiation greatly influences the intended results of the radiation, it is important to measure the dose to which a material is exposed.

In order to determine the exposure dose, conventional dosimeters, such as a cellulose triacetate film dosimeter, a polymethyl methacrylate dosimeter, a blue cellophane dosimeter, a radiochromic dosimeter, etc., have been used in this field of art. In addition to these dosimeters, a radiation-sensitive (color-changing) tape utilizing polyvinyl chloride has also been used.

Upon using the above cellulose triacetate dosimeter, polymethyl methacrylate dosimeter, and blue cellophane dosimeter, the determination of the exposed dose is complicated by the requirement that the absorbance of the dosimeter be determined using an ultraviolet absorbance meter after exposure.

In the above radiation color-changing tape utilizing polyvinyl chloride, the color changes relatively clearly in the region of an exposed dose of from about 1 to about 10 Mrad (megarad), but in the region of an exposed dose of less than about 1 Mrad or more than about 10 Mrad, the color-changing sensitivity is low and the relationship between the dose and the color change becomes indistinct. Therefore, such a dosimeter cannot be used in fields requiring an exposure dose of about 10 Mrad or more, e.g., crosslinking of plastics (such as electric cables, shrinkable tubes, etc.), and in fields requiring an exposure dose of about 1 Mrad or less, e.g., radiation for foods, although it can be used for an exposure dose of from about 1 to about 10 Mrad.

SUMMARY OF THE INVENTION

An object of the present invention is, therefore, to provide a dosimeter by which a wide range of exposure dose can be determined extremely easily.

Other objects of the present invention will become apparent from the following description.

As a result of the extensive investigations by the present inventors, it has been found that the above objects of the present invention are attained by a dosimeter comprising a support having provided thereon a radiation-sensitive (color-changing) layer which comprises (a) a polymer containing halogen atoms or a polymer containing acetic acid groups and (b) a pH-sensitive indicator dye capable of changing color according to the change in pH.

DETAILED DESCRIPTION OF THE INVENTION

Figure 1:
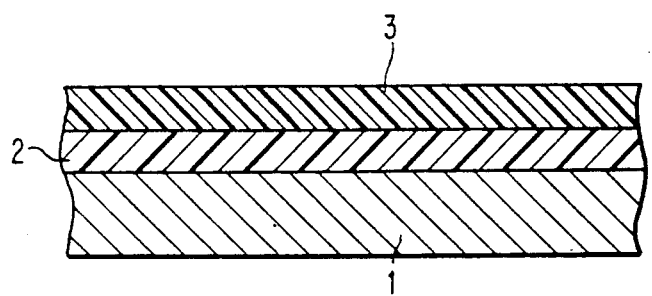
FIG. 1 illustrates a cross section of one embodiment of the dosimeter according to the present invention.

By the dosimeter according to the present invention, an extremely wide range of exposure dose can be determined easily. Particularly, an exposure dose of 10 Mrad or more and 1 Mrad or less, more particularly an exposure dose of from 10 to 50 Mrad and from 0.1 to 1 Mrad, can be determined easily.

One of the preferred embodiments of the dosimeter according to the present invention, of which the cross section is indicated in FIG. 1, comprises a support 1 having provided thereon a layer containing a polymer containing halogen atoms 2; having thereon a radiation-sensitive layer 3 containing (a) a polymer containing halogen atoms, (b) a pH-sensitive indicator dye and (c) an epoxy compound.

Another preferred embodiment of the present invention comprises a support which comprises a molded resin material having provided thereon a radiation-sensitive layer containing (a) a polymer containing acetic acid group, (b) a pH-sensitive indicator dye and (c) a bromine compound which is formed by replacing at least one hydrogen atom of methane, ethane, propane or butane with a bromine atom.

As the support used in the dosimeter of the present invention, various papers and a molded resin material are preferably used. Any of conventional high molecular materials used in the art can be used as the molded resin material. In view of, e.g., adhesion properties to the radiation-sensitive layer, polyethylene terephthalate, polysulfone, polyether sulfone, etc. are preferred. The form of the support is not limited, but in view of ease for determining the color change, it is preferably a transparent or white film or sheet.

The radiation-sensitive layer provided on the support contains a paint capable of exhibiting a predetermined color change varying with the amount of exposure to radiation and other additives, and contains, as essential components, a polymer containing halogen atom or a polymer containing acetic acid groups, and a pH-sensitive indicator dye. The meanings of the term "color-changing" and "color change" as used herein include any of coloring, discoloring, and other changes in color tone.

Examples of the polymer containing halogen atoms include a vinyl chloride resin, a vinyl chloride-vinyl acetate copolymer, an ethylene-vinyl chloride-vinyl acetate graft terpolymer, a chloroprene rubber, a chlorosulfonated ethylene rubber, a vinylidene chloride resin, a vinylidene fluoride resin, and derivatives thereof. Among these polymers, a vinyl chloride resin, a vinyl chloride-vinyl acetate copolymer, and an ethylene-vinyl chloride-vinyl acetate graft terpolymer are preferably used. The halogen content of the polymer varies depending on the kind of halogen atom, the dose to be measured, etc., and thus cannot be determined unconditionally. The halogen atoms contained in the polymer containing halogen atoms are preferably chlorine atoms. For example, in order to determine a dose of 5 Mrad or more, the preferred chlorine content of the polymer is at least about 20 wt %.

The above-mentioned halogen-containing polymers and preferred examples thereof can be used for the halogen-containing polymer layer which is optionally provided between the support and the radiation-sensitive layer.

Examples of the polymer containing acetic acid groups include a polyvinyl acetate resin, an ethylene-vinyl acetate copolymer, a vinyl acetate-vinyl chloride copolymer, an ethylene-vinyl acetate-vinyl chloride graft terpolymer, etc. Among these polymers, a polyvinyl acetate and an ethylene-vinyl acetate copolymer are preferably used. The acetic acid group content of the polymer varies depending on the dose to be measured, etc., and thus cannot be determined unconditionally, but in general those having an acetic acid group content of at least about 10 wt % are preferably used.

The molecular weight of the polymer containing halogen atoms and the polymer containing acetic acid groups is not limited provided that the polymers can be used as a film or sheet.

As the pH-sensitive indicator dye, which changes color according to the change in pH, any substance capable of changing color by change in pH, e.g., pH indicators, can be used. At least one of phenolphthalein, Methyl Yellow, Bromothymol Blue, Bromophenol Blue, Thymol Blue, and Methyl Red are preferably used since their color change is conspicuous. These indicators may be used alone or in combination with each other.

As the epoxy compound optionally used in the present invention, any compounds containing epoxy groups may be used. Examples thereof include an epoxidated soybean oil, an epoxy plasticizer, an epoxy resin, etc. When the radiation-sensitive layer contains the polymer containing halogen atoms, the color change thereof is made clearer by adding the epoxy compound, and the ranges of the dose and the color change can also be extended and controlled. The added amount of the epoxy compound can be determined depending on the dose to be measured.

Examples of the bromine compound formed by replacing at least one hydrogen atom of methane, ethane, propane, or butane with a bromine atom which is optionally used in the present invention includes ethyl bromide, ethylene bromide, trimethylene bromide, vinyl bromide, butyl bromide, propyl bromide, propylene bromide, bromoform, methyl bromide, and methylene bromide. When the radiation-sensitive layer contains a polymer containing acetic acid groups, the color change thereof is made clearer by adding the bromine compound, and the ranges of the dose and the color change can also be extended and controlled. Among these, bromoform makes the color change extremely conspicuous, and is most preferred.

The proportions of the components in the color-changing layer, i.e., the polymer containing halogen atoms or the polymer containing acetic acid groups and the pH-sensitive indicator dye as well as the epoxy compound or the bromine compound optionally used, is not unduly limited, and is determined suitably depending on the kind of the polymer and the dye used, the range of dose to be measured, and the region of color change.

In the preparation of the dosimeter of the present invention, first the polymer containing halogen atoms or the polymer containing acetic acid groups, the pH-sensitive indicator dye, the epoxy compound or the bromine compound if used, are mixed with a dispersing agent, a filler, and other additives if used. The mixture is then dissolved or dispersed in a good solvent for the polymer so as to prepare a radiation-sensitive (color-changing) paint. Thereafter, the paint obtained is coated on the support by conventional procedures, and then dried to prepare the dosimeter of the present invention.

As the examples of the solvent used in the preparation of the dosimeter, good solvent for a vinyl chloride resin include tetrahydrofuran, methyl ethyl ketone, etc., and those for a vinyl acetate resin include xylene, methyl ethyl ketone, etc.

The layer of the polymer containing halogen atoms which is optionally provided between the support and the radiation-sensitive layer can be prepared by coating in the form of a solution or by laminating in any conventional manner.

In the dosimeter of the present invention, a hydrogen halide or acetic acid is eliminated from the polymer containing halogen atom or the polymer containing acetic acid moieties, respectively, upon exposure to radiation. The thus-generated hydrogen halide or acetic acid makes change in pH of the radiation-sensitive layer, thus changing the color of the pH-sensitive indicator dye.

The amount of the hydrogen halide or acetic acid thus generated corresponds to the exposure dose of the dosimeter, and thus exposure dose corresponds to the pH value. Therefore, a wide range of the exposure dose can be determined by suitably arranging the color changing region by pH.

Without being bound by theory, the epoxy compound is considered to capture the hydrogen halide generated from the halogen-containing polymer. The relationship between the color-changing region and the exposure dose can be controlled and extended by adjusting the amount of the epoxy compound added.

The bromine compound accelerates the change in pH by generating bromic acid. The relationship between the color-changing region and the exposure dose can be controlled and extended by adjusting the amount of the bromine compound added.

The halogen-containing polymer layer optionally provided on the molded polymer support makes the color-change of the radiation-sensitive layer upon exposing to radiation more distinct.

The present invention will be described in more detail by reference to the following examples but is not to be construed as being limited thereto. Unless otherwise indicated, all parts, percents, and ratios are by weight.

EXAMPLE 1

To a resin composition consisting of a polyvinyl chloride and 2.5 PHR (parts by weight per hundred parts by weight of resin) of Methyl Yellow, an epoxidated fatty acid ester (oxirane oxygen content: 4.0 to 4.5%) as an epoxy compound was added in an amount of 4, 8, 16, and 30 PHR based on the amount of the polyvinyl chloride, and the mixture was dissolved in butyl acetate to prepare a radiation-sensitive paint. A polyvinyl chloride layer having a thickness of about 3 μm was provided on a polyester film support having a thickness of 50 μm, and the paint thus obtained was coated on the polyvinyl chloride layer in a dry thickness of 5 μm. Then, the coated layer was dried to prepare dosimeters according to the present invention. The dosimeters were exposed to an electron beam having an intensity of 0.4 MeV, varying the exposed dose to 10, 20, 30, and 40 Mrad. The color change of each dosimeter was inspected and the results obtained are shown in Table 1 below.

TABLE 1

| Added amount of epoxy compound (PHR) | Exposure dose (Mrad) | | | | |
|---|---|---|---|---|---|
| | 0* | 10 | 20 | 30 | 40 |
| 4 | Yellow | Red | Red | Red | Red |
| 8 | Yellow | Yellow | Red | Red | Red |
| 16 | Yellow | Yellow | Yellow | Red | Red |
| 30 | Yellow | Yellow | Yellow | Yellow | Red |

*before exposure

From the results shown in Table 1, it is evident that the color-changing region can be shifted to a higher exposure dose range by increasing the added amount of the epoxy compound. Furthermore, the dosimeters of the present invention achieve a sensitive color change, and can be used conveniently even in the high exposure dose region.

EXAMPLE 2

To a resin composition consisting of a polyvinyl chloride and 2.5 PHR of Bromocresol Green, an epoxidated soybean oil (oxirane oxygen content: 6.8%) as an epoxy compound was added in an amount of 2, 4, 8, and 16, PHR based on the amount of the polyvinyl chloride, and the mixture was dissolved in tetrahydrofuran to prepare a radiation-sensitive paint. A polyvinyl chloride layer having a thickness of about 3 μm was provided on a polyester film support having a thickness of 50 μm, and the paint thus obtained was coated on the polyvinyl chloride layer in a dry thickness of 5 μm. Then, the coated layer was dried to prepare dosimeters according to the present invention. The dosimeters were exposed to an electron beam having an intensity of 0.4 MeV varying the exposed dose to 10, 20, 30, and 40 Mrad. The color change of the dosimeters was inspected and the results obtained are shown in Table 2 below.

TABLE 2

| Added amount of epoxy compound (PHR) | Exposed dose (Mrad) | | | | |
|---|---|---|---|---|---|
| | 0* | 10 | 20 | 30 | 40 |
| 2 | Green | Yellow | Yellow | Yellow | Yellow |
| 4 | Green | Green | Yellow | Yellow | Yellow |
| 8 | Green | Green | Green | Yellow | Yellow |
| 16 | Green | Green | Green | Green | Yellow |

*before exposure

From the results shown in Table 2, it is evident that the color-changing region can be shifted to a higher exposure dose range by increasing the added amount of the epoxy compound. Furthermore, the dosimeters of the present invention achieve a sensitive color change, and can be used conveniently even in the high exposure dose region.

EXAMPLE 3

The same procedures as in Example 1 were repeated except that the radiation-sensitive paint was a polyvinyl chloride containing 2.5 PHR of Methyl Yellow and 2 or 4 PHR of tribasic lead sulfate. The dosimeters obtained were subjected to the same measurements as in Example 1. All the dosimeters changed color at an exposure dose of 10 Mrad.

Alternatively, the same procedures as above were repeated except that tribasic lead sulfate was omitted. All the dosimeters changed color at the same exposure dose as above, i.e., 10 Mrad.

From the results stated above, it is apparent that the color-changing region of the dosimeter of the present invention was extended to the high exposure dose range by adding the epoxy compound to the halogen-containing polymer.

EXAMPLE 4

The same procedures as in Example 1 were repeated except that the polyvinyl chloride layer was not provided on the support. The results obtained are shown in Table 3 below.

TABLE 3

| Added amount of epoxy compound (PHR) | Exposed dose (Mrad) | | | | |
|---|---|---|---|---|---|
| | 0* | 10 | 20 | 30 | 40 |
| 4 | Yellow | Orange | Red | Red | Red |
| 8 | Yellow | Yellow | Orange | Red | Red |
| 16 | Yellow | Yellow | Yellow | Orange | Red |
| 30 | Yellow | Yellow | Yellow | Yellow | Orange |

*before exposure

From the results shown in Table 3, it is apparent that the color change was made more sensitive by providing the halogen-containing polymer layer between the support and the radiation-sensitive layer when the halogen-containing polymer was used.

EXAMPLE 5

To a resin composition consisting of a polyvinyl acetate and 2.5 PHR of Methyl Yellow, bromoform as a bromine compound was added in an amount of 30 PHR based on the amount of the polyvinyl chloride, and the mixture was dissolved in butyl acetate to prepare a radiation-sensitive paint. The paint thus obtained was coated on a polyester film support (thickness: 50 μm) in a dry thickness of 5 μm. Then, the coated layer was dried to prepare dosimeters according to the present invention. The dosimeters were exposed to an electron beam having an intensity of 0.4 MeV at an exposure dose of 0.1 Mrad. The yellow color of the unexposed dosimeter was changed to red after an exposure of 0.1 Mrad.

From the results above, it is apparent that easy and convenient determination of exposure dose was attained by the dosimeter of the present invention even in a low exposure dose range.

EXAMPLE 6

To a resin composition consisting of a polyvinyl acetate and 2.5 PHR of Bromocresol Green, ethylenebromide as the bromine compound was added in an amount of 30 PHR based on the amount of the polyvinyl chloride, and the mixture was dissolved in tetrahydrofuran to prepare a radiation-sensitive paint. The paint thus obtained was coated on a polyester film support (thickness: 50 μm) in a dry thickness of 5 μm. Then, the coated layer was dried to prepare dosimeters according to the present invention. The dosimeters were exposed to an electron beam having an intensity of 0.4 MeV at an exposure dose of 0.1 Mrad. The yellowish green color of the unexposed dosimeter was changed to orange after an exposure of 0.1 Mrad.

From the results above, it is apparent that easy and convenient determination of exposure dose was attained by the dosimeter of the present invention even in a low exposure dose range.

EXAMPLE 7

To a resin composition consisting of a polyvinyl acetate and 0.1 PHR of Methyl Yellow, propylenebromide as the bromine compound was added in an amount of 30 PHR based on the amount of the polyvinyl chloride, and the mixture was dissolved in ethyl acetate to prepare a radiation-sensitive paint. The paint thus obtained was coated on a polyester film support (thickness: 50 μm) in a dry thickness of 5 μm. Then, the coated layer was dried to prepare dosimeters according to the present invention. The dosimeters were exposed to an electron beam having an intensity of 0.4 MeV at an exposure dose of 0.1 Mrad. The yellow color of the unexposed dosimeter was changed to red after an exposure of 0.1 Mrad.

From the results above, it is apparent that easy and convenient determination of exposure dose was attained by the dosimeter of the present invention, even in a low exposure dose range.

COMPARATIVE EXAMPLE

50 PHR of chlorinated paraffin (chlorine content: 70%) and 2.5 PHR of Methyl Yellow were added to an acryl resin (Aron1005 a trademark of Toa Gosei Chemical Industry Co., Ltd.), and the mixture was dissolved in butyl acetate to prepare a paint. The paint was coated on a polyester film support (thickness: 50 μm) in a dry thickness of 5 μm. The comparative dosimeter thus-obtained was subjected to the same exposure measurement as in Example 1. As a result, the color change of the comparative dosimeter was obscurely faint, and did not permit a sufficient determination of dosage.

As the foregoing results demonstrate, the dosimeter of the present invention permits easy and convenient determination of exposure dose in the range from a low exposure dose to a high exposure dose.

While the invention has been described in detail and with reference to specific examples thereof, it will be apparent to one skilled in the art that various changes and modifications can be made therein without departing from the spirit and scope thereof.

What is claimed is:

1. A dosimeter comprising:
   a support;
   a polymer layer containing halogen atoms provided on said support; and
   a radiation-sensitive layer provided on said polymer layer, comprising:
   (a) a polymer containing halogen atoms;
   (b) a pH-sensitive indicator dye; and
   (c) an epoxy compound in an amount such that the dosimeter is capable of determining an exposure of more than 10 Mrad by change of color of said radiation-sensitive layer;
   wherein said pH-sensitive indicator dye is selected from the group consisting of phenolphthalein, Methyl Yellow, Bromothymol Blue, Bromophenol Blue, Thymol Blue, Methyl Red, and Bromocresol Green.

2. A dosimeter as claimed in claim 1, wherein said support comprises a paper or a molded resin material.

3. A dosimeter as claimed in claim 2, wherein said support is a transparent film, a transparent sheet, a white film, or a white sheet, and said resin is selected from the group consisting of polyethylene terephthalate, polysulfone, and polyether or and a paper.

4. A dosimeter according to claim 1, wherein said polymer containing halogen atoms located in said radiation-sensitive layer is selected from the group consisting of a vinyl chloride resin, a vinyl chloride-vinyl acetate copolymer, an ethylene-vinyl acetate graft terpolymer, a chloroprene rubber, a chlorosulfonated ethylene rubber, a vinylidene chloride resin, and a vinylidene fluoride resin.

5. A dosimeter as claimed in claim 1, wherein said polymer containing halogen atoms in said layer provided between said support and said radiation-sensitive layer is selected from the group consisting of a vinyl chloride resin, a vinyl chloride-vinyl acetate copolymer, an ethylene-vinyl chloride-vinyl acetate graft terpolymer, a chloroprene rubber, a chlorosulfonated ethylene rubber, a vinylidene chloride resin, and a vinylidene fluoride resin.

6. A dosimeter as claimed in claim 1, wherein said epoxy compound is selected from the group consisting of an epoxidated soybean oil, an epoxy plasticizer, and an epoxy resin.

7. A dosimeter according to claim 1, wherein said polymer containing halogen atoms located in said radiation-sensitive layer, is a polymer containing chlorine atoms wherein the chlorine content of said polymer containing chlorine atoms is at least about 20 wt %; and said dosimeter is capable of determining an exposure of 5 Mrad or more.

8. A dosimeter as claimed in claim 1, wherein said dosimeter is capable of determining an exposure dose of from 10 to 50 Mrad by change of color of said radiation-sensitive layer.

9. A dosimeter comprising:
   a support;
   a radiation-sensitive layer provided on said support comprising:
   (a) a polymer consisting essentially of a polymer containing acetic acid groups;
   (b) a pH-sensitive indicator dye; and
   (c) a bromine compound which is formed by replacing at least one hydrogen atom of methane, ethane, propane, or butane with a bromine atom and which is present in an amount such that the dosimeter is capable of determining an exposure of 1 Mrad or less by change of color of said radiation-sensitive layer.

10. A dosimeter as claimed in claim 9, wherein said bromine compound is selected from the group consisting of ethyl bromide, ethylene bromide, trimethylene bromide, vinyl bromide, butyl bromide, propyl bromide, propylene bromide, bromoform, methyl bromide, and methylene bromide.

11. A dosimeter as claimed in claim 9, wherein said polymer containing acetic acid groups is selected from the group consisting of a polyvinyl acetate resin, an ethylene-vinyl acetate copolymer, a vinyl acetate-vinyl chloride copolymer, and an ethylene-vinyl acetate-vinyl chloride graft terpolymer.

12. A dosimeter as claimed in claim 9, wherein said polymer containing acetic acid groups has an acetic acid group content of at least about 10 wt %.

13. A dosimeter as claimed in claim 9, wherein said dosimeter is capable of determining an exposure dose of from 0.1 to 1 Mrad by change of color of said radiation-sensitive layer.

* * * * *